(No Model.)
L. O. BREKKE.
LAMP.
No. 293,559.  Patented Feb. 12, 1884.
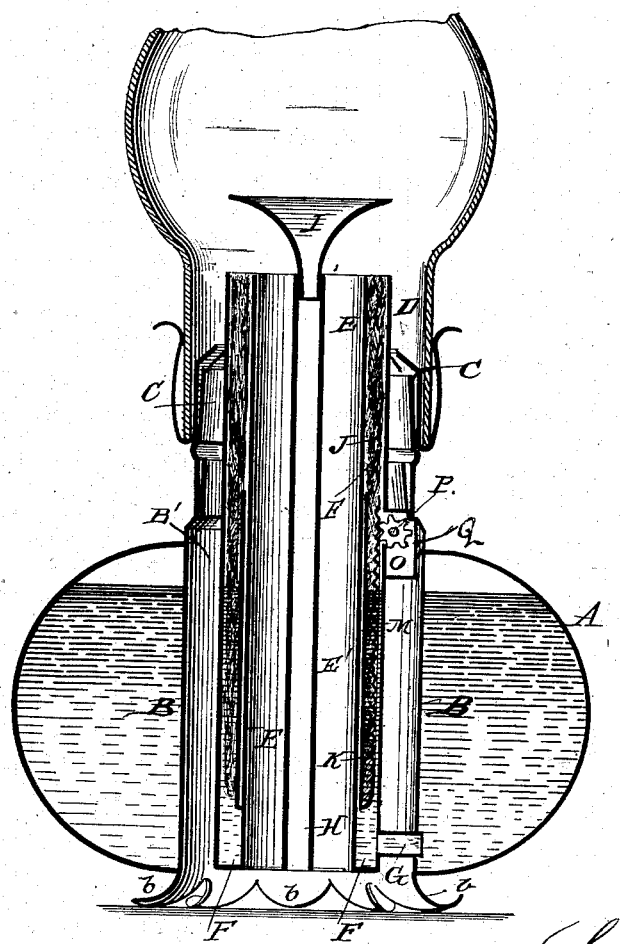
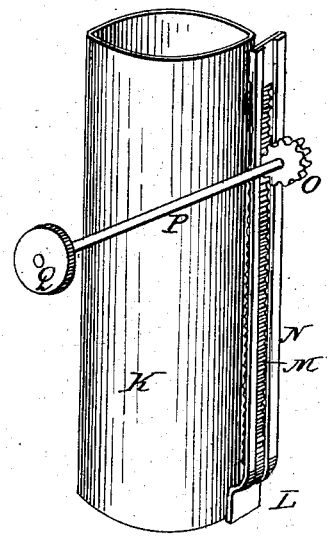
WITNESSES:
Lewis O. Brekke
INVENTOR.
By Louis Bagger & Co.
ATTORNEYS.

UNITED STATES PATENT OFFICE.

LEWIS OLSON BREKKE, OF DECORAH, IOWA, ASSIGNOR OF ONE-HALF TO L. E. DAVIDSON, OF SAME PLACE.

LAMP.

SPECIFICATION forming part of Letters Patent No. 293,559, dated February 12, 1884.

Application filed August 23, 1883. (No model.)

*To all whom it may concern:*

Be it known that I, LEWIS O. BREKKE, of Decorah, in the county of Winneshiek and State of Iowa, have invented certain new and useful Improvements in Lamps; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical sectional view of my improved lamp, and Fig. 2 is a detail view of the wick-raising mechanism.

Similar letters of reference indicate corresponding parts in both the figures.

My invention has relation to that class of lamps having round wicks and central draft, having the so-called "Argand" burners, in which the oil-reservoir has a tube passing through its center and opening at the bottom, inside which tube the wick-tube is placed, connecting with the reservoir by one or more small tubes; and my improvement consists in the novel construction and arrangement of the central tube which incloses the wick-tube, wick-raising mechanism, and central air-flue, as hereinafter more fully described, and particularly pointed out in the claim.

In the accompanying drawings, the letter A indicates the reservoir or oil-receptacle, through the center of which passes a tube, B, the lower end of which is open and accessible for draft from below, forming feet $b$, upon which the lamp may rest and be raised from the surface upon which it stands. The upper end of this tube or wall B projects above the top of the receptacle, and is shaped to form an annular seat, C, for the spring-collar or clasping-collar which supports the chimney, and two tubes, D and E, connected at their lower ends, forming an annular wick-tube, F, which is closed at its lower end, pass up through the tube formed in the center of the receptacle, forming an annular air-channel, B', between the wick-tube and the inner wall, B, of the reservoir. The wick-tube is connected at its lower end to the oil-receptacle by one or more short horizontal tubes, G, which cross the air-channel and convey the oil to the wick-tube, keeping the oil in the receptacle and wick-tube at the same level. A narrow tube, H, passes up through the center of the air-space E', formed inside the wick-tube, and is provided at its upper end with a flaring funnel-shaped top piece, I, which projects above and over the upper end of the wick-tube, deflecting and spreading the flame and causing an increased draft in the chimney. The wick J is tubular, and is placed around the wick-raising tube K, which is provided with a strip, L, fastened to the lower end of the tube, projecting upward, and forming a rack-bar, M, upon its outer side, having flanges N upon its sides, between which a pinion, O, fastened upon a shaft, P, having a milled disk, Q, at one end, and turning in bearings (not shown in the drawings) in the tubes, travels, engaging the rack, which pinion is inclosed in a casing, Q, preventing the oil in the wick-tube from passing into the annular air-channel through the opening in the outer wall of the wick-tube, through which the pinion projects.

I am aware that lamps of this class have been made before with a central air-flue having a deflecting-cap at the top, in combination with the annular wick-tube and its casing, separating it and the wick-raising mechanism from the oil-reservoir; nor do I claim such construction, broadly; but

What I claim as my improvement, and desire to secure by Letters Patent of the United States, is—

The combination, with the oil-reservoir, wick-tube, and central air-flue, of the cylindrical casing B, inserted centrally through the reservoir, having its open top shaped to form a seat for the chimney-holder and its projecting lower open end notched and bent outwardly to form the flaring feet or supports $b\ b$, as shown and set forth.

In testimony that I claim the foregoing as my own I have hereunto affixed my signature in presence of two witnesses.

LEWIS OLSON BREKKE.

Witnesses:
O. J. CLARK,
R. SMALL.